United States Patent Office 3,369,846
Patented Feb. 20, 1968

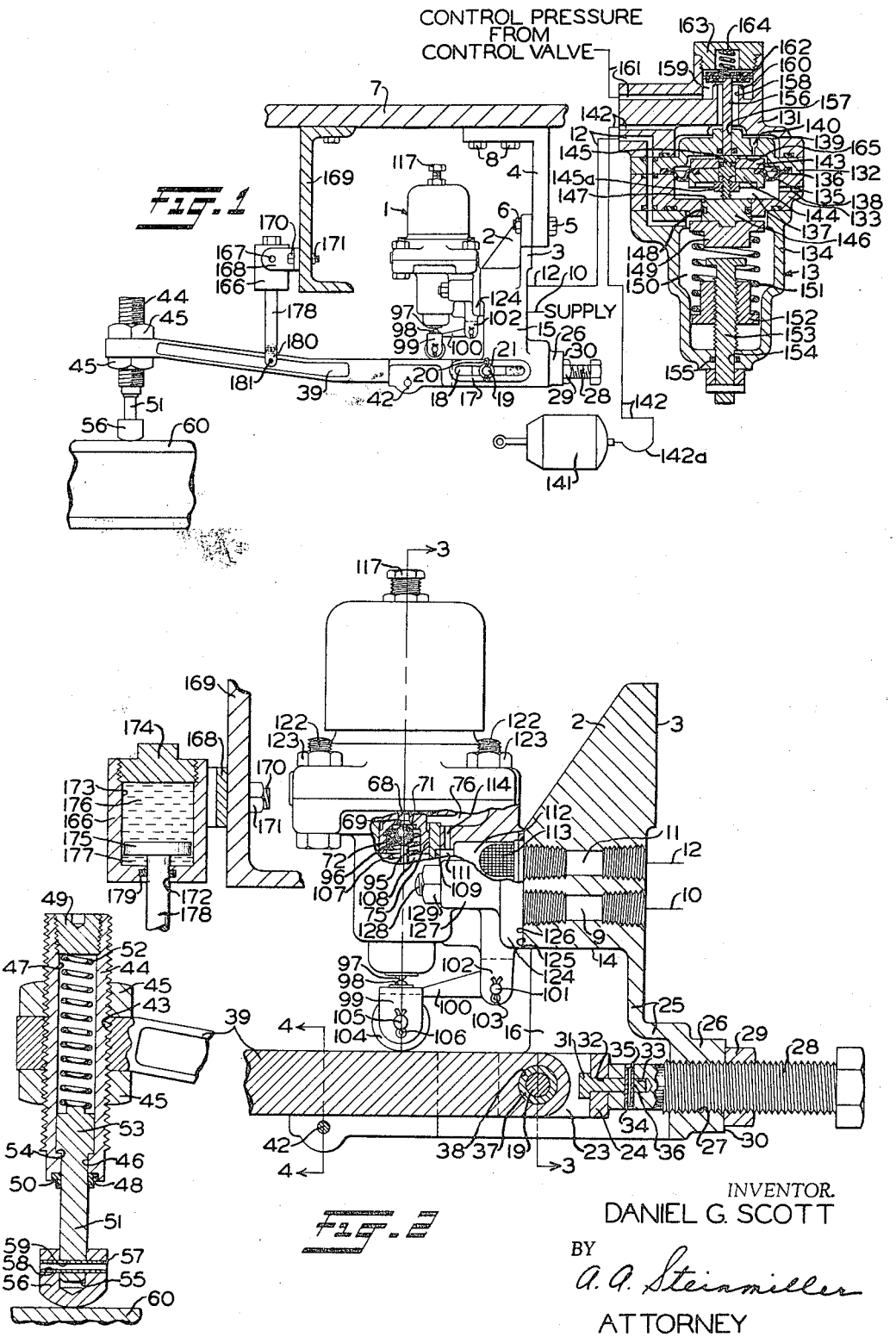

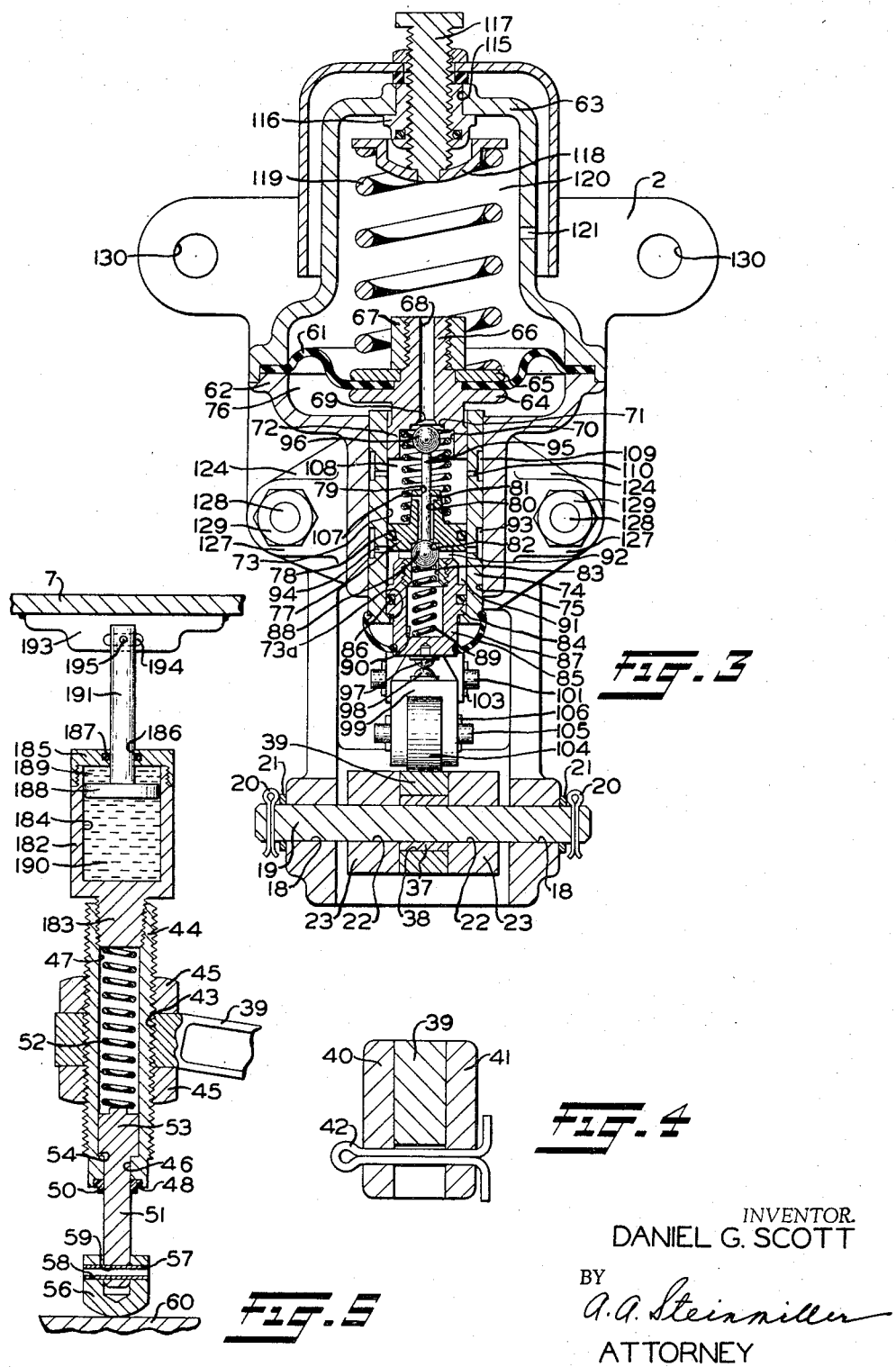

3,369,846
VARIABLE LOAD BRAKE CONTROL APPARATUS
Daniel G. Scott, Westmoreland, Pa., assignor to Westinghouse Air Brake Company, Wilmerding, Pa., a corporation of Pennsylvania
Filed May 25, 1966, Ser. No. 552,963
8 Claims. (Cl. 303—22)

ABSTRACT OF THE DISCLOSURE

A railway car load-sensing valve mechanism for interposition between a spring-supported (or sprung) part and an unsprung part of a car truck, the constant operation of which mechanism always provides a supply of fluid pressure, the value of which is in accordance with the weight of the load carried by the spring-supported part, to a limiting valve device which is adjusted thereby to operate to correspondingly limit the braking force on the car.

---

There is shown in Patent 2,919,161, issued Dec. 29, 1959, to Charles F. Hammer and assigned to the assignee of the present application, a variable load brake control apparatus for use on railway vehicles of the type having a body supported on fluid pressure springs carried by an unsprung part of the vehicle, the pressure in these springs being varied according to the weight of the load carried by the body to maintain the body at a predetermined uniform height above the rails on which the vehicle travels. This variable load brake control apparatus embodies therein a limiting valve device which is adjustable in accordance with changes in pressure in the fluid pressure springs to operate to limit the pressure obtained in a brake cylinder device to be in accordance with the pressure in the fluid pressure springs and therefore in accordance with the weight of the load carried by the vehicle body.

The majority of railway cars of the passenger and freight type in use today on American railroads are, however, not equipped with air springs having pressure regulation according to load, but rather, are equipped with standard car trucks in which the car body is supported on the sprung part of the truck and is deflected toward the unsprung part of the truck as the load on the car body is increased. Accordingly, the air spring pressure type of variable load brake control is not applicable to such cars since there is no available pressure source which corresponds to the load carried on the car body.

Variable load brake control apparatus is known and in use today on cars equipped with the standard type of car truck. Such types of variable load brake control apparatus customarily employ a strut cylinder, strut arm or similar weighing device which is operable to register the weight of the load on the car by measuring the degree of separation of the sprung and unsprung parts of the car truck which reflects the load on the car body. However, in order to avoid the operation of the weighing apparatus accidentally due to vertical oscillation of the car body incidental to travel on the rails, such weighing mechanisms are operative to measure the load on the car body only at certain times, such as when car doors are opened or in response to charging of the brake pipe following an emergency application of the brakes.

Accordingly, it is the general purpose of this invention to provide a simple and inexpensive load-sensing valve device for use on cars provided with metallic rather than fluid pressure springs which valve device is constantly operable to reflect the weight of the load carried by the vehicle and provide a constant supply of fluid pressure variable in value according to the weight of the load carried by the body of the vehicle to, such as, for example, a limiting valve device which is adjusted thereby to operate to correspondingly limit the pressure obtained in a brake cylinder device.

More specifically, this invention comprises a load-sensing valve device of the self-lapping type carried by a sprung part of a railway vehicle such as, for example, the vehicle body and operated by an arm pivotally mounted at one end on the body and carrying at its opposite end a member that has limited movement with respect thereto and is constantly biased into contact with an unsprung part of the vehicle which, for example, may be the side frame of the vehicle truck, to supply fluid under pressure from any suitable source to a control chamber of a fluid pressure adjusted limiting valve controlling the pressure supplied to the brake cylinder.

In the accompanying drawings:

FIG. 1 is a diagrammatic view, partly in section, showing a self-lapping type of load-sensing valve device and an operating arm therefor mounted on a sprung part of a railway vehicle, such as the body, above a stop member carried on any suitable unsprung part of the railway vehicle, such as the truck and connected to a variable load brake cylinder pressure limiting valve device.

FIG. 2 is an enlarged view, partly in section, of the load-sensing valve device shown in FIG. 1 showing certain structural details not made apparent in FIG. 1.

FIG. 3 is a vertical cross-sectional view, taken along the line 3—3 of FIG. 2 and looking in the direction of the arrows, showing the structural details of the self-lapping valve mechanism of the load-sensing valve device not made apparent in FIG. 2.

FIG. 4 is a vertical cross-sectional view, taken along the line 4—4 of FIG. 2 and looking in the direction of the arrows, showing further structural details of a load-measuring arm and a support therefor not made apparent in FIG. 2.

FIG. 5 is an enlarged view, in section showing a lever cushioning means for the load sensing valve device shown in FIG. 1 constructed in accordance with a second embodiment of the invention.

DESCRIPTION—FIGS. 1 TO 4

In FIG. 1 of the drawings, there is shown a self-lapping type of load-sensing valve device 1 having a pipe bracket 2 that is provided with a bolting face 3 to which one arm of an angle bracket 4 is secured by a pair of bolts 5 and nuts 6, only one of which appears in FIG. 1. The other arm of the angle bracket 4 is secured to a sprung part of a railway car such as, for example, the car floor 7 by a pair of cap screws 8.

As shown in FIG. 2 of the drawings, the pipe bracket 2 is provided with a supply passageway 9 extending longitudinally therethrough to the right-hand end of which is connected one end of a supply pipe 10 the opposite end of which is connected to any suitable source (not shown) of fluid under pressure. The pipe bracket 2 is also provided with a delivery passageway 11 extending longitudinally therethrough parallel to and above the supply passageway 9. Connected to the right-hand end of the delivery passageway 11 is one end of a pipe 12 the opposite end of which is connected to a brake cylinder pressure limiting valve device 13 hereinafter described in detail.

Extending downward from and integral with the bottom 14 of the pipe bracket 2 are a pair of parallel spaced-apart sides or walls 15 and 16 which appear, respectively, in FIGS. 1 and 2 of the drawings. The outside face of each of the walls 15 and 16 is provided with an outwardly extending boss 17 of oval configuration as shown in FIG. 1. An elongated horizontal slot 18 extends through each of the walls 15 and 16 and its corresponding boss 17, the slots 18 being coaxially arranged for receiving slidably therein the respective opposite ends of a fulcrum pin 19. Each end of the pin 19 extends slightly beyond the outside surface of the corresponding boss 17 and is provided with a bore for receiving therein a cotter pin 20, between which and the outside surface of the boss is disposed a washer 21 as shown in FIGS. 1 and 3 of the drawings.

As is also shown in FIG. 3, the pin 19 extends through coaxial bores 22 formed in the parallel spaced-apart jaws 23 of the clevis 24 which is disposed between the spaced-apart walls 15 and 16 that are connected by an off-set web 25 integral therewith and with the bottom 14 of the pipe bracket 2 as shown in FIG. 2. The web has formed integral therewith on the lower right-hand side thereof a boss 26 through which and the web 25 extends a bore 27 provided with internal screw threads that have screw-threaded engagement with corresponding external screw threads formed on an adjusting screw 28 which carries thereon a lock nut 29 that can be tightened against a flat face 30 formed on the boss 26. The adjusting screw 28 can thus be locked in any one of a plurality of positions to thereby vary the position of the pivot pin 19 to correspondingly vary the lever ratio of a load-weighing lever hereinafter described in detail whereby the variable load brake control apparatus constituting the present invention can be adapted for use on cars having different total spring deflections.

The left-hand end of the adjusting screw 28 abuts the right-hand end of the clevis 24 and is connected thereto by a headed pin 31 that extends through a bore 32 provided in the clevis and into a coaxial bottom bore 33 of the same diameter formed in the screw 28, and by a locking pin 34 that extends through a bore 35 formed in the screw 28 and a coaxial bore 36 of the same diameter extending through the headed pin 31.

As shown in FIG. 3, rockably mounted on the pin 19 and disposed between the jaws 23 of the clevis 24 is a wear bushing 37 which is press-fitted into a bore 38 formed in a load weighing lever 39 adjacent the right-hand end thereof. The lever 39 extends between a pair of guide arms 40 and 41 shown in FIG. 4 these guide arms being formed integral with the respective walls 15 and 16 and extending inward therefrom one toward the other to form a gap or opening therebetween that is sufficiently wide to receive the lever 39 therein. A cotter pin 42 extends through coaxial bores formed in the guide arms 40 and 41 and serves to limit counterclockwise rocking of the lever 39 as viewed in FIGS. 1 and 2 of the drawings.

As shown in FIG. 2, adjacent the left-hand end thereof the lever 39 is provided with a screw-threaded bore 43 the internal screw threads of which have screw-threaded engagement with external screw threads formed on a stud member 44. This stud member 44 carries a pair of lock nuts 45 by which the stud member 44 may be locked in any one of a plurality of adjusted positions with respect to the lever 39.

As is also shown in FIG. 2, the stud member 44 is provided with a bore 46 and two coaxial counterbores 47 and 48 extending inward from the respective opposite ends thereof. The outer end of the counterbore 47 is provided with internal screw threads which have screw-threaded engagement with external screw threads formed on a plug 49 that closes the upper end of the counterbore 47. Press-fitted into the counterbore 48 is a bushing or scraper 50 which is constructed of for example, plastic and which is disposed about a rod member 51 that is slidably mounted in the bore 46. The scraper 50 serves to scrape or clean contaminants from the periphery of the rod member 51 as it is moved relative to the stud member 44 against the yielding resistance of a spring 52 that is disposed within the counterbore 47 and interposed between the plug 49 and a collar 53 formed on the upper end of the rod member 51. The spring 52 serves to normally bias the collar 53 against a shoulder 54 formed by the bottom of the counterbore 47.

The lower end of the rod member 51 extends into a bottom bore 55 formed in a foot 56 and is secured to this foot by a pin 57 that extends through a bore 58 therein and a coaxial bore 49 in the rod member 51.

The foot 56 is constantly biased by spring means in the load-sensing valve device 1, in a manner hereinafter explained, against a stop 60. This stop 60 is located substantially midway the width of the truck and may be such as, for example, a cross member of a truck frame from which is suspended, as by hangers, a spring plank on which rests the usual car bolster springs (not shown) that in turn support the car bolster (not shown) on which is carried one end of the car body having the floor 7. The four corners of the truck frame are supported by equalizer springs (not shown) the lower end of each of which rests on a corresponding spring seat (not shown). The two equalizer spring seats on each side of the car truck are carried by an equalizer (not shown) on the corresponding side of the car truck, and each end of this equalizer in turn is supported on a corresponding journal box on the respective side of the truck.

If the car springs fail or break, the car body would drop downward toward the stop 60 which, as stated above, may be a cross member of the truck frame. Should this occur, the lever 39 will be rocked clockwise. This clockwise rocking of the lever 39 is effective to operate the load-sensing self-lapping valve device 1 until a hereinafter-described control spring of this valve device is compressed solid after which the spring 52 provides for downward movement of the lever 39 and stud member 44 carried thereby relative to the rod member 51 and foot 56 which remain stationary since this foot is supported by the stop 60. Accordingly, the spring 52 prevents breakage or damage to the lever 39 should the car springs fail.

The self-lapping load-sensing valve device 1 shown in detail in FIG. 3 of the drawings comprises a diaphragm 61 the outer periphery of which is clamped between a main casing section 62 and a cover member 63 that is secured to the main casing section 62 by any suitable means.

The inner periphery of the diaphragm 61 is clamped between a combined diaphragm follower and exhaust seat member 64 and an annular diaphragm plate 65 through which a screw-threaded stem 66 integral with the exhaust valve seat member 64 extends to receive a screw-threaded nut 67 which is tightened against the diaphragm plate 65.

The above-mentioned combined diaphragm follower and exhaust valve seat member 64 of the self-lapping load-sensing valve device 1 is provided with a bore 68 having an annular exhaust valve seat 69 formed at its lower end. A counterbore 70 that is coaxial with the bore 68 extends upward from the lower end of the combined diaphragm follower and exhaust valve seat member 64 to the lower end of a second counterbore 71 of smaller diameter coaxial therewith at the upper end of which is the exhaust valve seat 69.

The combined diaphragm follower and exhaust valve seat member 64 is provided on its lower side with a cylindrical skirt portion 72 that is slidably guided in a corresponding counterbore 73 that is coaxial with a bore 73a extending through a bushing 74 that is press-fitted into a bore 75 that extends through the main casing section 62. The upper end of the bore 75 opens into a chamber 76 formed by the cooperative relationship of the diaphragm 61 and the main casing section 62.

Sealingly and slidably mounted in the counterbore 73 below the skirt portion 72 of the combined diaphragm follower and the exhaust valve seat member 64 is a supply valve seat piston member 77 that is provided with a peripheral annular groove in which is disposed an O-ring 78 that forms a seal with the wall surface of the bore 73 to prevent flow of fluid under pressure from each side of the piston member 77 to the other. The supply valve seat member 77 is also provided with a bore 79, a coaxial counterbore 80 and a cross bore 81 which, as shown in FIG. 3, is located at the upper end of the counterbore 80. The supply valve seat piston member 77 has a supply valve seat 82 formed at the lower end of the counterbore 80 which is coaxial with a second counterbore 83 of larger diameter in the piston member 77. The lower end of the supply valve seat member 77 is provided with external screw threads which have screw-threaded engagement with corresponding internal screw threads formed on the interior of a cup-shaped piston member 84 that is slidably mounted in the counterbore 73. Cup-shaped piston member 84 is provided with a portion 85 of reduced diameter which extends through the bore 73a. This cup-shaped piston member 84 above the portion 85 of reduced diameter is provided with a peripheral annular groove in which is disposed an O-ring 86 that forms a seal with the wall surface of the counterbore 73 the lower end of which is open to atmosphere via the bore 73a and a resilient boot member 87 that is provided with two annular beads which respectively fit into corresponding grooves formed in the portion 85 of the cup-shaped piston member 84 and in the bushing 74. It will be understood that since the boot member 87 is formed of some type of resilient material, such as, for example rubber, fluid under pressure can flow between the beads thereon and the corresponding groove in which each bead is disposed.

Disposed in the counterbore 83 is a ball-type supply valve 88 which is biased in the direction of its valve seat 82 by a spring 89 that is interposed between the lower end of a bottom bore 90 in the piston member 84 and the supply valve 88.

It can be seen from FIG. 3 that the cup-shaped piston member 84 cooperates with the supply valve seat piston member 77 and with the wall surface of the counterbore 73 to form a chamber 91 which is open to the interior of the counterbore 83 via a plurality of arcuately spaced ports 92 in the supply valve seat piston member 77. This chamber 91 is also open to an annular chamber 93 constituted by a peripheral annular groove formed in the bushing 74 via a plurality of arcuately spaced ports 94 provided in the bushing 74. The hereinbeforementioned supply passageway 9 (FIG. 2) which extends through the pipe bracket 2 continues through the wall of the main casing section 62 and opens into the annular chamber 93 so that fluid under pressure from the supply source that is connected to the supply pipe 10 is always present in the annular chamber 93. Since the annular chamber 93 is connected to the chamber 91 by the ports 94, the fluid under pressure present in the chamber 93 flows to the chamber 91 so that the pressure in the chambers 93 and 91 is always the same as that in the source of fluid under pressure (not shown) to which the supply pipe 10 (FIG. 2) is connected.

As shown in FIG. 3 of the drawings, the ball-type supply valve 88 is connected by a cylindrical stem 95 to a ball-type exhaust valve 96 that is disposed in the counterbore 70, it being understood that the stem 95 is coaxial with the counterbore 70.

As shown in FIGS. 1, 2 and 3 of the drawings, the lower end of the cup-shaped piston member 84 is provided with a headed wear pin 97 the head of which abuts a corresponding headed wear pin 98 that is carried by the upper end of a clevis 99 that is integral with one end of a lever 100 (FIG. 2). The other end of the lever 100 is pivotally mounted on a pin 101 the opposite ends of which extend respectively through corresponding bores in the jaws of a clevis 102 and are retained therein by means of a pair of cotter pins 103, the clevis 102 being integral with the main casing section 62. Disposed between the jaws of the clevis 99 is a roller 104 that is rotatably mounted on a pin 105 the opposite ends of which extend through corresponding bores in the jaws of the clevis 99 and are retained therein by a pair of cotter pins 106.

As shown in FIG. 3 of the drawings, the roller 104 is constantly biased against the upper side of the load-weighing lever 39 by a spring 107 that is disposed in surrounding relation to the stem 95 and interposed respectively between a shoulder formed by the upper end of the counterbore 70 and the upper side of the supply valve seat piston member 77. It will be noted that the force of this spring 107 is transmitted to the roller 104 via the supply valve seat piston member 77, the cup-shaped piston member 84, the headed wear pins 97 and 98, the clevis 99 and the pin 105. Also, it will be noted from FIG. 3 that the spring 107 is effective via the piston member 77, the supply valve 88 and the stem 95, to normally maintain the exhaust valve 96 out of seating contact with exhaust valve seat 69.

Furthermore, it should be noted that the initial compressive force of spring 107 greatly exceeds the initial compressive force of the hereinbefore-mentioned spring 52 in order that limited vertical movement of the rod 51, foot 56 and stop 60 resulting from vibratory forces acting thereon may occur without effecting clockwise rocking of the lever 39 from its empty position shown in FIG. 1 to cause undesired seating of the exhaust valve 96 on its corresponding seat 69 and subsequent unseating of supply valve 88 from the seat 82.

It can be seen from FIG. 3 that the supply valve seat piston member 77 cooperates with the cylindrical skirt portion 72 of the combined diaphragm follower and exhaust valve seat member 64 and with the wall surface of the counterbore 73 to form a chamber 108. This chamber 108 is open to an annular chamber 109 constituted by a peripheral annular groove formed in the bushing 74 via a plurality of arcuately spaced ports 110 provided in the bushing 74. As shown in FIG. 2 of the drawings, the annular chamber 109 is connected to the hereinbefore-mentioned delivery passageway 11 in the pipe bracket 2 via a passageway 111 and a chamber 112 formed in the main casing section 62, and a strainer device 113. As is also shown in FIG. 2, the passageway 111 is connected to the chamber 76 below the diaphragm 61 (FIG. 3) via a restricted passageway or choke 114 formed in the casing section 62.

As shown in FIG. 3, the cover member 63 is provided with a bore 115 into which is press-fitted a flanged plug 116 that has a screw-threaded bore for receiving a screw-threaded adjusting screw 117 on the lower end of which is a portion of reduced diameter that extends through a bore formed in a cup-shaped spring seat 118. A control spring 119 is interposed between the spring seat 118 and the diaphragm plate 65 it being understood that while the various elements of the self-lapping load-sensing valve device 1 occupy the position in which they are shown in the drawings this spring 119 is not compressed. Accordingly, the spring 107 is effective to bias the exhaust valve seat 69 out of seating contact with the exhaust valve 96.

Therefore, the delivery passageway 11 (FIG. 2) and the pipe 12 connected thereto are open to atmosphere via strainer device 113, chamber 112, passageway 111, annular chamber 109, ports 110 (FIG. 3), chamber 108, counterbores 70 and 71, past exhaust valve seat 69, bore 68, a chamber 120 formed by the cooperative relationship of the diaphragm 61 and cover member 63, and a port 121 provided in the cover member 63 which is secured to the main casing section 62 by a plurality of bolts 122 (FIG. 2) and nuts 123 to clamp therebetween the outer periphery of the diaphragm 61 as shown in FIG. 3.

In order to secure the main casing section 62 to the pipe bracket 2, this casing section 62 has formed integral therewith a bracket 124 (FIG. 2). This bracket 124 is provided with a bolting face 125 that abuts a corresponding bolting face 126 formed on the pipe bracket 2. The bracket 124 is also provided with a pair of bosses 127 each of which has extending therethrough a smooth bore for receiving therein a stud 128 that is carried by or anchored in the pipe bracket 2. One of a pair of nuts 129 has screw-threaded engagement with a corresponding one of each of the studs 128 to force the bolting face 125 on the bracket 124 against the bolting face 126 on the pipe bracket 2 thereby to secure the main casing section 62 to the pipe bracket 2. The pipe bracket 2 in turn is secured to the angle bracket 4 by the bolts 5 (FIG. 1) and nuts 6, as hereinbefore stated, these bolts 5 extending through corresponding smooth bores 130 in the pipe bracket 2 which bores 130 are shown in FIG. 3 of the drawings.

The limiting valve device 13 (FIG. 1) is secured to and carried by any suitable sprung part of the vehicle and may comprise a sectionalized casing comprising four casing sections 131, 132, 133 and 134 secured together by any suitable means (not shown). The casing sections 132 and 133 clamp therebetween the outer periphery of a resilient diaphragm or abutment 135 which cooperates with these casing sections to form on the respective opposite sides of the diaphragm 135 two chambers 136 and 137 the latter being constantly open to atmosphere via a short passageway 138 provided in the casing section 133.

The chamber 136 above the diaphragm 135 is connected to a delivery chamber 139 formed by the cooperative relationship of the adjacent casing sections 131 and 132 via a restricted passageway or choke 140 formed in the casing section 132. This delivery chamber 139 is in turn connected to a brake cylinder device 141 by a passageway and corresponding pipe 142, and a flexible hose 142a, the flexible hose being necessary since the brake cylinder device 141 is carried by the unsprung part of the vehicle.

The inner periphery of the diaphragm 135 is clamped between two diaphragm followers 143 and 144 which are secured together by a bolt 145 that extends through coaxial central bores in these followers and a nut 145a.

The lower end of the bolt 145 rests against the upper side of a piston member 146 that is slidably mounted in a bore 147 formed in the casing section 133. This piston member 146 is provided with a peripheral annular groove in which is disposed an O-ring 148 that forms a sliding seal with the wall surface of the bore 147. The lower side of the piston member 146 abuts a first spring seat 149 that is disposed in a chamber 150 formed by the cooperative relationship of the casing sections 133 and 134 to which chamber 150 the hereinbefore-mentioned pipe 12 is connected by a correspondingly numbered passageway extending through the casing sections 131, 132, 133 and 134. A spring 151 is interposed between the first spring seat 149 and a second spring seat 152 that is provided with an internally screw-threaded bore the screw threads of which have screw-threaded engagement with corresponding external screw threads formed on an adjusting stem 153 the lower unthread end of which extends through a bore 154 in the casing section 134 to the exterior therof. The wall surface of the bore 154 is provided with an internal annular groove in which is disposed an O-ring 155 that forms a seal with the peripheral surface of the unthreaded end of the stem 153 to prevent leakage of fluid under pressure from the chamber 150 to atmosphere.

As shown in FIG. 1, the spring 151 is effective via the spring seat 149 and piston member 146 to bias the head of the bolt 145 against the lower end of a stem 156 that is coaxial therewith and extends with a sliding fit through a bore 157 formed in the casing section 132 and with substantial clearance through a coaxial bore 158 in the casing section 131. This bore 158 connects the chamber 139 to a chamber 159 provided in the casing section 131 and has formed at its upper end an annular valve seat 160. Opening into the chamber 159 is one end of a passageway 161 formed in the casing section 131 the opposite end of this passageway being connected by a pipe bearing the same numeral to which, for example, may be the brake cylinder passageway in a railway car brake control valve device (not shown).

Disposed in the chamber 159 is a flat disc-type valve 162 between the upper side of which and a screw-threaded plug 163 that has screw-threaded engagement with corresponding internal screw threads formed in the casing section 131 is interposed a spring 164 that is effective to bias the valve 162 toward the valve seat 160 and into contact with the upper end of the stem 156 while the spring 151 biases the head of the bolt 145 against a stop surface 165 formed on the lower side of the casing section 132.

If desired, mechanical cushioning means, such as, for example, a dash pot device, may be provided to reduce or cushion movement of the lever 39 resulting from vibration occurring while a railway vehicle is traveling along a railway track at a high rate of speed or resulting from relative movement between the sprung and unsprung part of a railway vehicle caused by the side sway of the vehicle body.

A first embodiment of the lever cushioning means is shown in FIGS. 1 and 2 of the drawings and comprises a cup-shaped cylinder 166 that has formed integral therewith two diametrically arranged and outwardly extending trunnions 167 only one of which appears in FIG. 1. These trunnions are pivotally mounted in the opposite jaws of a combined clevis and bracket 168. This combined clevis and bracket 168 is secured to, as for example, the web portion of one of a pair of spaced-apart parallel center sills 169 that constitute a part of the car body and support the car floor 7, by a pair of bolts 170 and nuts 171. Only one of these center sills 169 and one of the bolts 170 and nuts 171 is shown in FIGS. 1 and 2 of the drawings. The cup-shaped cylinder 166 is provided with a bore 172 and a coaxial counterbore 173 the upper end of which counterbore is provided with internal screw threads that have screw-threaded engagement with external screw threads formed on a plug 174 that serves to close the upper end of counterbore 173.

Slidably mounted in the counterbore 173 is a piston 175 the diameter of which is sufficiently less than the diameter of the counterbore 173 to provide substantial clearance between the piston 175 and the wall surface of the counterbore. The piston 175 cooperates with the cylinder 166 and the plug 174 to form on the respective opposite sides of the piston two chambers 176 and 177 which are filled with some suitable fluid such as, for example, oil prior to securing the plug 174 to the cylinder 166.

As shown in FIG. 2 of the drawings, one end of a piston rod 178 is secured by any suitable means (not shown) to the lower face of the piston 175. This piston rod 178 extends downward through the bore 172 the wall surface of which is provided with an internal groove in which is disposed an O-ring 179 that forms a sliding seal with the peripheral surface of the piston rod 178 to prevent leakage of fluid from the chamber 177.

As shown in FIG. 1 of the drawings, the lower end of the piston rod 178 is provided with a clevis 180 between the jaws of which is disposed the lever 39 that is pivotally connected thereto by a pin 181 that extends through a bore in the lever and corresponding coaxial bores in the jaws of the clevis.

OPERATION—INITIAL CHARGING

While the various elements of the variable load brake control apparatus constituting the present invention occupy the position in which they are shown in FIGS. 1 to 4 inclusive of the drawings, the chamber 150 (FIG. 1) in the brake cylinder limiting device 13 is open to atmosphere via passageway and corresponding pipe 12, delivery passageway 11 (FIG. 2), strainer device 113, chamber 112, passageway 111, annular chamber 109, ports 110 (FIG. 3), chamber 108, counterbores 70 and 71, past exhaust valve 96 which is now unseated from exhaust valve seat 69, bore 68, chamber 120, and port 121 in cover member 63. Since the chamber 76 is connected to the passageway 111 via choke 114 (FIG. 2), the chamber 76 is also open to atmosphere.

Likewise, the brake cylinder device 141 (FIG. 1) is open to atmosphere via the flexible hose 142a, pipe and corresponding passageway 142, chamber 139, bore 158, past valve 162 which is now unseated from its valve seat 160, chamber 159, passageway and corresponding pipe 161, and the brake control valve device which it may be assumed is in its release position in which the pipe 161 is connected therethrough to atmosphere. Since the chamber 136 is connected to the chamber 139 via the choke 140, the chamber 136 is likewise open to atmosphere.

Prior to supplying fluid under pressure to the source of fluid under pressure to which the supply pipe 10 is connected, the self-lapping load-sensing valve device 1 will be originally adjusted by effecting rotation, by means such as, for example, a wrench, of the adjusting screw 117 in the direction to move the spring seat 118 downward as viewed in FIG. 3 of the drawing. As the spring seat 118 is thus moved downward, it is effective via the control spring 119 and diaphragm plate 65 to deflect the diaphragm 61 downward. This downward deflection of the diaphragm 61 is effective to move the combined diaphragm follower and exhaust valve seat member 64 downward against the yielding resistance of the spring 107, which is a substantially lighter spring than the control spring 119, until the exhaust valve seat 69 is moved into seating contact with the exhaust valve 96. When the exhaust valve seat 69 is thus moved into seating contact with the exhaust valve 96, communication is closed between the chamber 150 (FIG. 1) in the brake cylinder limiting valve device 13 and atmosphere.

If now the source to which the supply pipe 10 (FIG. 1) is connected, is charged with fluid under pressure, this fluid under pressure will flow therefrom to the chamber 91 (FIG. 3) via the supply pipe 10, supply passageway 9 (FIG. 2), annular chamber 93 (FIG. 3), and ports 94. The chamber 91 is open to the interior of the counterbore 83 via the ports 92. Therefore, fluid under pressure will flow from the chamber 91 to the interior of the counterbore 83 and the coaxial bottom bore 90 until the pressure therein is the same as in the source to which the supply pipe 10 is connected.

In order that the brake cylinder pressure limiting valve device 13 operates to provide or limit the pressure in the brake cylinder device 141 to that required to provide the proper braking force on an empty car, a chosen pressure, such as for example, ten pounds per square inch, is required in the chamber 150 of this limiting valve device. Therefore, in order to provide this chosen pressure in the chamber 150, the self-lapping load-sensing valve device 1 will be further adjusted by the continued rotation of the adjusting screw 117 subsequent to movement of the exhaust valve seat 69 (FIG. 3) into seating contact with the exhaust valve 96. This continued rotation of the adjusting screw 117 in the same direction is effective to cause further downward deflection of the diaphragm 61 which in turn moves the exhaust valve seat member 64 downward simultaneously therewith. Since the exhaust valve 96 is now seated on the exhaust valve seat 69 formed on member 64 and is connected by the stem 95 to the supply valve 88, this continued downward movement of the exhaust valve seat member 64 in response to continued rotation of the adjusting screw 117 is effective via the exhaust valve 96 and stem 95 to move the supply valve 88 downward out of seating contact with the supply valve seat 82.

When the supply valve 88 is thus moved downward out of seating contact with the supply valve seat 82, the fluid under pressure present in the interior of the counterbore 83, and supplied thereto from the source of fluid under pressure in the manner hereinbefore explained, flows past the now unseated supply valve 88 and thence to the chamber 150 (FIG. 1) in the limiting valve device 13 via the counterbore 80 (FIG. 3), crossbore 81, chamber 108, ports 110, annular chamber 109, passageway 111 (FIG. 2) and chamber 112 in casing section 62, strainer device 113, passageway 11, and pipe and corresponding passageway 12 (FIG. 1).

Some of the fluid under pressure thus supplied past the unseated supply valve 88 (FIG. 3) and thence to passageway 111 (FIG. 2) flows therefrom to the chamber 76 via the choke 114 at a rate controlled by the size of this choke. As fluid under pressure is thus supplied to the chamber 76, the pressure in this chamber is increased. Since the effective area of the lower side of the diaphragm 61 (FIG. 3) is subject to the prssure in the chamber 76, when the pressure in this chamber is increased sufficiently to overcome the resistance of the control spring 119, the diaphragm 61 will be deflected upward against the yielding resistance of the control spring 119. As the diaphragm 61 is thus deflected upward, the combined diaphragm follower and exhaust valve seat member 64 having formed thereon exhaust valve seat 69 is likewise moved upward whereupon the spring 89 is rendered effective to move the supply valve 88, stem 95, and exhaust valve 96 upward until the supply valve 88 is moved into seating contact with its seat 82 it being understood that this spring 89 maintains the exhaust valve 96 seated on its seat 69 during this upward movement.

From the foregoing it is apparent that as the adjusting screw 117 is rotated to effect unseating of the supply valve 88, fluid under pressure is supplied to the chamber 150 (FIG. 1) in the brake cylinder pressure limiting valve device 13 and to the chamber 76 (FIG. 3) below the diaphragm 61 to increase the pressure in these chambers in accordance with the amount of rotation imparted to the adjusting screw 117. It is also apparent that the increase in pressure in the chamber 76 operates the self-lapping load-sensing valve device 1 to a lap position in which the supply valve 88 is reseated on its seat 82 to cut off further flow of fluid under pressure from the source of supply to the chamber 76 in the valve device 1 and to the chamber 150 (FIG. 1) in the limiting valve device 13.

Accordingly, it should be apparent from the foregoing that by rotation of the adjusting screw 117 in the proper direction, the desired, chosen pressure, which, as hereinbefore-mentioned, may be, for example, ten pounds per square inch, may be obtained in the chamber 150 in the limiting valve device 13 which chosen pressure is that required to insure that the limiting valve device 13 operates to provide or limit the pressure supplied to the brake cylinder device 141 to that necessary to insure that the proper braking force is obtained on an empty car.

*Service application of the brakes on an empty vehicle*

If a railway car that is provided with the variable load brake control apparatus shown in the drawings is empty, the sprung part of the car, which may be the car body having the floor 7 (FIG. 1), is more remote from or higher above the stop 60 on the unsprung part of the car which, as hereinbefore-mentioned, may be a cross member of the truck frame of the car, than when the car is loaded because the coiled car springs which support the car body are not appreciably compressed while the car is not loaded. Consequently, the car body and the stop 60 occupy the position in which they are shown in FIG. 1 of the drawings. In this position of the car body and the stop 60, the foot 56 rests on the stop 60 and the load-weighing lever 39 occupies the position shown in FIG. 1. While the loading-weighing lever 39 occupies the position shown in FIG. 1, the roller 104 (FIGS. 1, 2, and 3) will be positioned by the lever 39 so that the headed wear pin 98 carried by the clevis 99 abuts the headed wear pin 97 it being understood that the self-lapping valve device 1 has been adjusted in the manner hereinbefore described in detail to provide the chosen pressure of, for example, ten pounds per square inch, in the chamber 150 (FIG. 1) in the brake cylinder pressure limiting valve device 13. It will also be understood that the supply valve 88 (FIG. 3) is now seated on its corresponding seat 82, and that the exhaust valve 96 is likewise seated on its seat 69.

When it is desired to effect a service application of the brakes, the fluid pressure in the usual train brake pipe (not shown) will be reduced in the customary manner to cause the brake control valve device to effect the supply of fluid under pressure from an auxiliary reservoir (not shown) to pipe and passageway 161 (FIG. 1) which pipe 161, as hereinbefore stated, may be connected to, for example, the brake cylinder passageway in the brake control valve device. Fluid under pressure thus supplied to the pipe and passageway 161 will flow to the chamber 159 in the brake cylinder pressure limiting valve device 13. Since the valve 162 is now unseated from its seat 160, as shown in FIG. 1, fluid under pressure supplied to the chamber 159 flows therefrom to the brake cylinder device 141 via bore 158, chamber 139, and pipe and passageway 142 and flexible hose 142a.

Some of the fluid under pressure supplied to the chamber 139 in the manner described above flows to the chamber 136 above the diaphragm 135 via the choke 140. The fluid under pressure thus supplied to the chamber 136 together with the force of the spring 164 acts on the diaphragm 135 in a direction opposite the trapped fluid under pressure in the chamber 150 and the force of the spring 151 so that, subsequent to equalization of the forces on the opposite sides of the diaphragm 135, the further increase in the pressure in the chamber 136 is effective to deflect the diaphragm 135 downward against the yielding resistance of the spring 151 and the fluid pressure force resulting from the trapped fluid under pressure present in the chamber 150.

As the diaphragm 135 is thus deflected downward, the spring 164 is rendered effective to move the valve 162 into contact with its seat 160 to cut off further flow of fluid under pressure to the brake cylinder device 141 and chamber 136.

From the foregoing, it is apparent that the pressure supplied to the pressure chamber of the brake cylinder device 141 is in accordance with the pressure of the trapped fluid under pressure in the chamber 150 in the brake cylinder pressure limiting valve device 13 which, for an empty car, as hereinbefore stated, may be, for example, ten pounds per square inch. It will be understood, however, that the pressure thus supplied to the pressure chamber of the brake cylinder device 141 provides an adequate braking force for an empty vehicle.

*Release of a service application on an empty vehicle*

When it is desired to effect a release of a service brake application, the pressure in the train brake pipe will be increased in the usual manner whereupon the brake control valve device will operate in a manner well known by those skilled in the braking art to establish a communication between the pipe 161 and atmosphere.

When the pipe 161 is thus opened to atmosphere, fluid under pressure will be vented from the chamber 159 to atmosphere. As fluid under pressure is thus vented from the chamber 159, as just described, the fluid under pressure in the chamber 139 and in the brake cylinder device 141 will lift the valve 162 from its seat 160 to the position shown in FIG. 1 whereupon a communication hereinbefore described is established between the pressure chamber in the brake cylinder device 141 and atmosphere to release fluid under pressure therefrom thereby releasing the brakes on the car. Since chamber 136 is connected to chamber 139 via choke 140, fluid under pressure will also be released from chamber 136 to atmosphere.

*Service application of the brakes on a loaded vehicle*

Let it be supposed that the brake equipment shown in the drawings has been charged in the manner hereinbefore described in detail.

Let it now be supposed that the car body is loaded with lading. As this lading is placed on the floor 7 of the car body, it is effective to compress the metallic car bolster springs that support the car body via the truck bolster. The equalizer springs are likewise compressed since the load is transmitted thereto via the spring plank, hangers, and truck frame. Accordingly, the floor 7 of the car body, the angle bracket 4, pipe bracket 2 and self-lapping load-sensing valve device 1 are moved downward from the position shown in FIG. 1 toward the stop 60 which, as hereinbefore stated, may be, for example, a cross member of the truck frame, a distance proportional to the weight of the lading or load placed on the floor 7 of the car body.

Since the foot 56 rests on the stationary stop 60, this foot cannot move downward as the floor 7 of the car body, angle bracket 4, pipe bracket 2 and load-sensing valve device 1 are moved downward by the placing of the lading on the floor 7 of the car body. Therefore, the foot 56 becomes a fulcrum for the left-hand end of the lever 39.

It will be noted that the pin 19, on which the right-hand end of the lever 39 is rockably mounted, is carried by the jaws 23 of the clevis 24 which in turn is connected by the headed pin 31 to the left-hand end of the screw 28 carried by the boss 26 (FIG. 2). This boss 26 is integral with the web 25 which is a part of the pipe bracket 2. Accordingly, it is apparent that the pin 19 moves downward simultaneously with the floor 7 of the car body, angle bracket 4, pipe bracket 2 and load-sensing valve device 1.

As hereinbefore stated, the initial compressive force of the spring 107 (FIG. 3) exceeds the initial compressive force of spring 52 (FIG. 2). Therefore, as the load-sensing valve device 1 is initially moved downward, the lever 39 is likewise moved downward without any clockwise rocking about the pin 19. Since the foot 56 rests on the stationary stop 60, this downward movement of the lever 39 is effective to move the stud member 44 and plug 49 downward relative to the collar 53, rod member 51 and foot 56 to thereby compress the spring 52 until its yielding resistance is increased to a value such that, together with the mechanical advantage provided by the lever 39, the initial compressive force of the spring 107 (FIG. 3) is overcome. Therefore, further downward movement of the pin 19, resulting from a further increase in the load on the car, is effective to cause the lever 39 to be rocked clockwise, as viewed in FIGS. 1 and 2, about the pin 19 as the load on the car body is further increased.

As the lever 39 is rocked clockwise about the pin 19, it is effective via the roller 104 and clevis 99 to rock the lever 100 clockwise about the pin 101. Since the headed wear pin 98 is carried by the upper end of the clevis 99 and abuts the headed wear pin 97 carried by the lower end of the portion 85 (FIG. 3) of piston member 84, the clockwise rocking of the lever 39, in response to increasing the load on the car, is effective, via the piston member 84, to move the supply valve seat piston member 77 and valve seat 82 thereon against the yielding resistance of the spring 107 upward away from the supply valve 88, it being remembered that the control spring 119 is a heavier spring than the spring 107 and therefore, is effective to maintain the exhaust valve seat member 64 against upward movement at this time.

When the valve seat 82 is thus moved upward out of seating contact with supply valve 88, fluid under pressure, which is supplied from the source of supply to the interior of the counterbore 83 and bottom bore 90, in the manner hereinbefore explained, flows past the now unseated supply valve 88 and thence to the chamber 150 (FIG. 1) in the limiting valve device 13 via counterbore 80 (FIG. 3), crossbore 81, chamber 108, ports 110, annular chamber 109, passageway 111 (FIG. 2), chamber 112, strainer device 113, passageway 11, and pipe and passageway 12 (FIG. 1).

It will be noted that some of the fluid under pressure supplied to the passageway 111 (FIG. 2) flows therefrom to the chamber 76 below the diaphragm 61 (FIG. 3) via the choke 114 (FIG. 2). As fluid under pressure is thus supplied to the chamber 76, the pressure therein is increased to deflect the diaphragm 61 upward against the yielding resistance of the control spring 119. As the diaphragm 61 is thus deflected upward, the exhaust valve seat member 64 having seat 69 thereon is simultaneously moved upward whereupon the spring 89 is rendered effective to move the supply valve 88, stem 95 and exhaust valve 96 upward to maintain exhaust valve 96 seated on its seat 69 and to move supply valve 88 into seating contact with its seat 82 thereby to cut off further flow of fluid under pressure to the chambers 150 (FIG. 1) and 76 (FIGS. 2 and 3).

From the foregoing it is apparent that as the lever 39 is rocked clockwise about the pin 19, it is effective to operate the self-lapping load-sensing valve device 1 to effect the supply of fluid under pressure from the source of supply to the chambers 150 and 76 so that the pressure in these chambers is increased in accordance with the degree of clockwise rocking of the lever 39 and therefore with the increase in the weight of the lading placed on the car. It is also apparent that the fluid under pressure supplied to the chamber 76 operates the self-lapping load-sensing valve device 1 to a lap position subsequent to cessation of rocking of the lever 39 in which lap position fluid under pressure is trapped in the chamber 150 it being understood that the degree of this trapped pressure is proportional to the weight of the lading or load on the car.

Subsequent to movement of the load sensing valve device 1 to its lap position in which fluid under pressure is trapped in the chamber 150 of the limiting valve device 13, relative movement between the sprung and unsprung parts of the vehicle may occur, as the result of vibration or side sway, while the railway vehicle is traveling along a railway track. This relative movement is very rapid and consequently flow of fluid from one side of the piston 175 to the other is so restricted that rocking movement of the lever 39 is prevented. It should be noted however, that the yielding resistance of the spring 52 provides for movement of the stop 60, foot 56, rod member 51 and collar 53 relative to the stud member 44 and lever 39, and vice versa. Therefore, the spring 52 in cooperation with the cushioning means including the piston 175 and cylinder 166 prevents operation of the load-sensing valve device 1 to effect an undesired change in the pressure in the chamber 150 in the brake cylinder limiting valve device 13.

It will be noted from FIG. 1 that, as the lever 39 is rocked clockwise about the pin 19 in response to an increase in load on the car, a force is transmitted to the dash pot piston 175 (FIG. 2) via the pin 181 (FIG. 1), clevis 180 and piston rod 178 which force acts in an upward direction, as viewed in FIG. 2, on this piston. This force thus transmitted to the piston 175 is effective to force the fluid, such as oil, in the chamber 176 above the piston to the chamber 177 below the piston via the clearance space provided between the piston and the wall surface of the counterbore 173 at a rate determined by this clearance space which is in accordance with the amount the diameter of the counterbore 173 exceeds the diameter of the dash pot piston 175.

From the foregoing, it is apparent that when the load is increased on the body of the railway vehicle provided with the variable load brake apparatus shown in FIGS. 1 to 4 inclusive, of the drawings, the lever 39 is rocked clockwise about the pin 19 at a slow rate which rate is in accordance with the clearance space provided between the dash pot piston 175 (FIG. 2) and the wall surface of the counterbore 173 since, as the lever 39 is rocked clockwise, it is effective to move the piston 175 upward within the counterbore 173 and force the fluid in the chamber 176 through the clearance space provided between the periphery of the piston 175 and the wall surface of the counterbore 173 to the chamber 177.

By providing a limited clearance space between the periphery of the piston 175 and the wall surface of the counterbore 173, it will be apparent that vibratory forces, which are active over a comparative short interval of time, imparted to the lever 39 while the vehicle provided with the variable load brake control apparatus shown in FIGS. 1 to 4 inclusive, is traveling along a railway track, are ineffective to rock the lever 39 about the pin 19. Consequently, no pressure change is effected in the chamber 150 of the brake cylinder pressure limiting valve device 13.

A service application of the brakes may now be effected in the manner hereinbefore explained whereupon fluid under pressure is supplied to the chambers 139 and 136 in the limiting valve device 13 and to the brake cylinder device 141 via the pathway previously described. Fluid under pressure is thus supplied to the chamber 136 until the pressure established in this chamber, together with the force of the spring 164, establishes a downwardly acting force which exceeds the upwardly acting force resulting from the trapped fluid pressure in the chamber 150 and the force of spring 151. When this downwardly acting force exceeds the upwardly acting force, diaphragm 135 is deflected downward against the yielding resistance of the spring 151 and the fluid pressure force resulting from the trapped fluid under pressure in the chamber 150 it being understood that the pressure of this fluid in the chamber 150 is in accordance with the weight of the lading or load on the car.

As the diaphragm 135 is thus deflected downward, the spring 164 is rendered effective to seat valve 162 on its seat 160 to cut off further flow of fluid under pressure to the brake cylinder device 141 and chamber 136.

Since the pressure of the trapped fluid under pressure in the chamber 150 is in accordance with the weight of the lading or load on the car, and is substantially in excess of the hereinbefore-mentioned chosen pressure of, for example, ten pounds per square inch, required in chamber 150 for providing the proper braking force on an empty car, it should be apparent that the pressure established in the pressure chamber of the brake cylinder device 141 provides a braking force on the car that is in accordance with the weight of the lading on the car and is adequate to insure that the loaded car is properly braked.

A release of a service brake application on a partly or fully loaded car is effected in the same manner as hereinbefore explained for an empty car and therefore, need not be repeated.

The operation of the variable load brake control apparatus constituting the present invention is the same when effecting an emergency brake application as when effecting a service brake application. Accordingly, a detailed description of the operation of this aperture when effecting an emergency brake application is not deemed necessary.

DESCRIPTION—FIG. 5

According to a second embodiment of the invention, a lever cushioning means, which is shown in FIG. 5, replaces the lever cushioning means shown in FIGS. 1 and 2 to provide a cushioning means that functions substantially the same as that shown in FIGS. 1 and 2.

According to the embodiment of the invention shown in FIG. 5, a lever cushioning means comprises a cup-shaped cylinder 182 that is arranged in an inverted position with respect to the cylinder 166 shown in FIGS. 1 and 2. Formed integral with the bottom of the cup-shaped cylinder 182 is a boss 183 having thereon external screw-threads which may have screw-threaded engagement with the internal screw-threads provided in the outer end of the counterbore 47 in the stud member 44 which, as in the first embodiment of the invention, is carried adjacent the left-hand end of the lever 39.

As shown in FIG. 5, the cylinder 182 is provided with a bottom bore 184 the upper end of which is closed by a cap member 185 having internal screw threads which have screw-threaded engagement with external screw threads formed on the upper end of the cylinder 182. This cap member 185 is provided with a central bore 186 the wall surface of which has formed therein a groove in which is disposed an O-ring 187.

Slidably mounted in the bottom bore 184 is a piston 188 the diameter of which, like that of the piston 175 shown in FIG. 2, is sufficiently less than the diameter of the bottom bore 184 to provide substantial clearance between the piston 188 and the wall surface of the bottom bore 184. The piston 188 cooperates with cylinder 182 and the cap member 185 to form on the respective opposite sides of the piston two chambers 189 and 190 which are filled with some suitable fluid such as, for example, oil prior to securing the cap member 185 to the piston 182.

As shown in FIG. 5, one end of a piston rod 191 is secured by any suitable means (not shown) to the upper face of the piston 188. This piston rod 191 extends upward through the bore 186 in the cap member 185 and through the O-ring 187 carried thereby and has its upper end disposed between a pair of parallel spaced-apart bracket members 193 secured to the car floor 7 by any suitable means such as, for example welding, only one of these bracket members appearing in FIG. 5. Each of the bracket members 193 is provided with an elongated slot 194 for receiving therein a corresponding end of a pin 195 that is press-fitted into a bore provided adjacent the upper end of the piston rod 191.

The dash pot or cushioning action of the piston 188 and cylinder 182 is substantially the same as that of the piston 175 and cylinder 166 shown in FIG. 2. Therefore, a detailed description of the operation of the lever cushioning means constituting the second embodiment of the invention is not deemed necessary.

Having now described the invention, what I claim as new and desire to secure by Letters Patent is:

1. A variable load brake control apparatus for a railway vehicle having an unsprung part and a sprung part movable toward and away from the unsprung part respectively in accordance with an increase or a decrease in the load on the sprung part, said apparatus comprising, in combination:
   (a) a brake cylinder device,
   (b) a limiting valve means interposed in a communication through which fluid under pressure may be supplied to said brake cylinder device for limiting the pressure of fluid supplied to said brake cylinder device to different values corresponding to a control fluid pressure supplied to said limiting valve means, said limiting valve means comprising:
      (i) valve means for controlling flow of fluid under pressure through the communication to said brake cylinder device,
      (ii) a spring, and
      (iii) a movable abutment operatively connected to said valve means and constantly subject on one side to the force of said spring, said abutment having on its respective opposite sides a pair of chambers, to one of which is communicated the pressure of fluid supplied to said brake cylinder device and in the other of which is constantly established a control fluid pressure corresponding to the load on the vehicle to act jointly with said spring on said one side of said abutment, whereby fluid under pressure may be supplied via said valve means to said brake cylinder device and to said one chamber until the pressure therein exerts a force on the other side of said abutment that exceeds the combined forces of said spring and the pressure in said other chamber whereupon said abutment operates said valve means to cut off flow of fluid under pressure to said brake cylinder device thereby to limit the pressure therein in accordance with the value of the control fluid pressure established in said other chamber and therefore in accordance with the load on the sprung part of the vehicle,
   (c) a self-lapping valve device carried by the sprung part of the vehicle, said valve device being provided with an operating plunger movable longitudinally from a predetermined position to effect operation of said valve device to constantly supply said control fluid pressure to said other chamber of said limiting valve means in accordance with the degree of movement of said plunger out of its predetermined position, and
   (d) a lever for effecting movement of said plunger, said lever having one end rockably mounted on the sprung part of the vehicle and the opposite end constantly in contact with the unsprung part whereby rocking of said lever in response to a variation of load on the sprung part effects movement of said plunger to cause said valve device to supply said control fluid pressure.

2. A variable load brake control apparatus for a railway vehicle, as claimed in claim 1, further characterized in that said lever carries thereon a contact element for unconnectedly contacting the unsprung part of the vehicle, and in that a resilient biasing means biases said contact element against said unsprung part whereby said contact element is yieldingly movable relative to said lever.

3. A variable load brake control apparatus for a railway vehicle, as claimed in claim 1, further characterized in that said lever comprises:
   (a) an arm member pivotally mounted at one end on the sprung part of the vehicle,
   (b) a hollow cylindrical member carried adjacent the other end of said arm member,
   (c) a contact plunger slidably carried in said hollow cylindrical member for contacting the unsprung part of the vehicle, and
   (d) resilient biasing means carried within said hollow cylindrical member for biasing said plunger toward one end of said hollow cylindrical member and into contact with the unsprung part of the vehicle.

4. A variable load brake control apparatus for a railway vehicle, as claimed in claim 1, further characterized in that said lever comprises:
   (a) a first member pivotally mounted at one end on the sprung part of the vehicle and having adjacent its opposite end a screw-threaded bore,
   (b) a second member provided with external screw-threads for adjustable screw-threaded engagement with the screw threads of said bore, said second member having therein a bore and a coaxial counterbore,
   (c) a contact member slidably mounted in said bore so that one end thereof contacts the unsprung part of the vehicle, said member being provided at its other end with a collar slidably mounted in said counterbore to limit movement of said contact member in one direction relative to said second member, and
   (d) resilient biasing means disposed in said counterbore and interposed between said collar and said second member for biasing said contact member against the unsprung part whereby said contact member is yieldingly movable relative to said first and second members of said lever.

5. A variable load brake control apparatus for a railway vehicle, as claimed in claim 2, further characterized by a cushioning means connected to the sprung part of the vehicle and to said lever for inhibiting rocking movement of said lever occasioned by oscillatory movement of said contact element incidental to vibratory movement between the sprung and unsprung part of the vehicle occurring while the vehicle is traveling along a railway track.

6. A variable load brake control apparatus for a railway vehicle, as claimed in claim 1, further characterized by cushioning means for said lever, said cushioning means comprising:
 (a) a cylinder connected to the opposite end of said lever for movement therewith, said cylinder having a bore therein,
 (b) a piston having a diameter less than the diameter of said bore and being slidably mounted in said bore with clearance therebetween, said piston being connected to the sprung portion of the vehicle for movement therewith, and
 (c) fluid disposed in said bore on each side of said piston, said fluid being displaceable from one side of said piston to the other side via said clearance between said piston and the wall of said bore in response to rocking of said lever in either direction.

7. A variable load brake control apparatus for a railway vehicle, as claimed in claim 4, further characterized by means comprising:
 (a) a cylinder connected to said second member and having a bore therein,
 (b) a piston having a diameter less than the diameter of said bore, said piston being slidably mounted in said bore with clearance therebetween and operably connected to the sprung part of the vehicle, and
 (c) fluid disposed in said bore on each side of said piston for a limited rate of flow from one side of said piston to the other via said clearance whereby said means limits the rate of rocking of said first member thereby providing for movement of said contact member movable relative to said first member in response to vibratory movement of either the sprung part or the unsprung part of the vehicle relative to the other part.

8. A variable load brake control apparatus for a railway vehicle, as claimed in claim 1, further characterized by dash pot means connected to the sprung part of the vehicle and to said lever intermediate the ends thereof.

References Cited

UNITED STATES PATENTS

| | | | |
|---|---|---|---|
| 3,199,928 | 8/1965 | Chouings | 303—22 |
| 3,180,694 | 4/1965 | Stelzer | 303—22 X |
| 2,029,977 | 2/1936 | Anderson | 303—22 |
| 3,118,707 | 1/1964 | Simmons et al. | |

FOREIGN PATENTS 27,087  12/1956  Germany.

EUGENE G. BOTZ, *Primary Examiner.*